US007092559B2

(12) United States Patent
Soussaline et al.

(10) Patent No.: US 7,092,559 B2
(45) Date of Patent: Aug. 15, 2006

(54) IMAGING APPARATUS ASSOCIATED WITH AN IMAGE DATABASE

(75) Inventors: Francoise Soussaline, Paris (FR); Alexandre Papine, Verrieres le Buisson (FR)

(73) Assignee: IMSTAR S.A., Paris (FR)

( * ) Notice: Subject to any disclaimer, the term of this patent is extended or adjusted under 35 U.S.C. 154(b) by 643 days.

(21) Appl. No.: 10/257,120

(22) PCT Filed: Apr. 3, 2001

(86) PCT No.: PCT/FR01/00994

§ 371 (c)(1),
(2), (4) Date: Feb. 26, 2003

(87) PCT Pub. No.: WO01/77649

PCT Pub. Date: Oct. 18, 2001

(65) Prior Publication Data

US 2003/0167130 A1     Sep. 4, 2003

(30) Foreign Application Priority Data

Apr. 6, 2000    (FR) .................................. 00 04411

(51) Int. Cl.
*G06K 9/00* (2006.01)
(52) U.S. Cl. .............................. 382/133; 435/4; 435/6; 422/58; 707/100
(58) Field of Classification Search ................ 382/128, 382/129, 130, 131, 132, 133; 700/85; 702/19; 715/968; 707/100, 102, 200; 435/4, 6, 7.1, 435/7.2; 436/174, 177; 422/50, 52, 58

See application file for complete search history.

(56) References Cited

U.S. PATENT DOCUMENTS 4,122,518 A    10/1978  Castleman et al.
6,187,267 B1 *  2/2001  Taylor et al. .................. 422/52

(Continued)

FOREIGN PATENT DOCUMENTS

FR    2 532 756 A    3/1984
FR    2 532 756 A1   3/1984

(Continued)

OTHER PUBLICATIONS

International Search Report of PCT/FR01/00994, dated Sep. 8, 2001.

(Continued)

*Primary Examiner*—Jingge Wu
*Assistant Examiner*—Abolfazl Tabatabai
(74) *Attorney, Agent, or Firm*—Christie, Parker and Hale, LLP (57) ABSTRACT

The invention concerns an image database (30) comprising a plurality of tables (TAB) each including fields concerning at least image acquisition conditions, and/or sample identification, the tables being connected to one another in accordance with selected relationships. Each image acquisition comprises a control for displacing the sample-holder, parameters of the filtering means or parameters of the processing means, and an input for values of each acquisition parameter in the corresponding fields of the database tables. The imaging apparatus comprises a consultation unit for interrogating the image database with a request containing at least a criterion corresponding to at least an acquisition parameter, to select images fulfilling said criterion and to display said resulting selected images. The consultation unit comprises processing and analysing means for processing the resulting acquired images, and related data, retrieved or derived from processing said images.

7 Claims, 5 Drawing Sheets

U.S. PATENT DOCUMENTS

| | | | |
|---|---|---|---|
| 6,582,903 B1 * | 6/2003 | Rigler et al. | 435/6 |
| 6,656,428 B1 * | 12/2003 | Clark et al. | 422/58 |
| 6,743,576 B1 * | 6/2004 | Sabry et al. | 435/4 |

FOREIGN PATENT DOCUMENTS

| | | |
|---|---|---|
| WO | WO 96/05488 A | 2/1996 |
| WO | WO 98/38490 | 9/1998 |

OTHER PUBLICATIONS

International Preliminary Examination Report of PCT/FR01/00994, dated May 6, 2002.

Kerlavage et al., "Data Management and Analysis for High-Throughput DNA Sequencing projects," IEEE Engineering in Medicine and Biology Magazine, vol. 14, No. 6, Nov. 1, 1995, pp. 701-717, US, IEEE Inc. New York, XP000598295.

Allee, "Data Management for Automated Drug Discovery Laboratories," Laboratory Robotics and Automation, vol. 8, No. 5, 1996, pp. 307-310, Wiley, USA, XP002134398.

* cited by examiner

FIG.1

EXHIBIT D

IMAGING APPARATUS ASSOCIATED WITH AN IMAGE DATABASE

CROSS-REFERENCE TO RELATED APPLICATION

This application is a National Phase Patent Application of International Application Number PCT/FR01/00994, filed on Apr. 3, 2001, which claims priority of French Patent Application Number 00/04411, filed Apr. 6, 2000.

The present invention relates to the imaging of samples and to the management of the images with the aid of an integrated and polyvalent relational database.

Its general application is to the acquisition and quantitative analysis of images and, more particularly, to the applications of the life sciences based on the high-resolution and high-speed identification and measurement of DNA (deoxyribonucleic acid).

One particular application for it is, for example, in studies involving immunofluorescence, cytogenetics, applied genomics, cytology, molecular biology, histo-cytochemistry, pharmacology, toxicology and molecular pathology etc.

Numerous apparatuses for imaging biological samples by fluorescence are already known. In the patent FR-A-2532756, for example, there is a description of an apparatus for imaging by fluorescence, in which an excitation light beam is directed onto a sample arranged on a sample holder. The radiation emitted by the sample thus excited is directed towards detection means. The signals detected are then processed to acquire a corresponding image of all or some of the sample observed. In the case of fluorescence, the excitation beam is filtered in terms of wavelength in order to select the radiation of use for producing the phenomenon of fluorescence, while the radiation emitted is filtered in order to stop the radiation of no significance to the phenomenon of fluorescence.

The prior art also includes imaging apparatuses (in the patent U.S. Pat. No. 4,122,518—CASTLEMAN et al, for example) which furthermore comprise an electronic control unit capable of adjusting the displacement of the sample holder. Generally, the images acquired are stored in digital form in a database. With the aid of such a database, the user is able to perform tasks of data processing, of recognition of objects and of their classification (karyotyping). In practice, the user selects an image by its file name, which offers little possibility of sorting. Moreover, management of the database is generally limited to a single, relatively static, application with little possibility of development, which is awkward in terms of its interactivity with the user.

The present invention provides a solution to these problems.

Thus it aims to provide an integrated polyvalent relational image database which, when associated with an appropriate imaging apparatus, makes it possible, in particular, to perform selection and processing of images according to much richer and more sophisticated criteria than merely the name of the file corresponding to the image, in particular according to parameters linked to the acquisition of the images and/or to the identification of the sample and/or to the data linked to and/or derived from and/or extracted from these images.

It thus relates to an imaging apparatus of the type comprising:
- a sample holder that can be adjusted at least in the X and Y directions;
- an illumination device comprising a light source capable of generating an illumination beam;
- first transfer means capable of directing the said illumination beam onto a sample arranged on the sample holder;
- a receiving device comprising second transfer means capable of directing the radiation emitted and/or transmitted by the sample thus illuminated to detection means mounted at the output of the receiving device, the first and/or second transfer means comprising adjustable filtering means;
- processing means for processing the signals thus detected by the detection means in order to acquire a corresponding image of at least one zone of the sample;
- an electronic control unit capable of controlling at least the displacement of the sample holder, the parameters of the filtering means and/or the parameters of the processing means according to a plurality of modes of image acquisition; and
- an image database linked to the processing means and capable of containing the images thus acquired.

According to a general definition of the invention, the image database comprises a plurality of tables, each comprising fields relating at least to the conditions of acquisition of the images and/or to the identification of the sample, the tables being linked to each other according to selected relationships;
- each image acquisition comprising a command for the displacement of the sample holder and/or parameters of the filtering means and/or parameters of the processing means and capture of the values of each acquisition parameter in the corresponding fields of the tables of the database;
- the imaging apparatus furthermore comprising a look-up unit for interrogating the image database in accordance with at least one query containing at least one criterion corresponding to at least one acquisition parameter so as to select the images that meet the said criterion and display and/or process the said images thus selected.

The applicant has thus observed in a surprising manner that in mastering and controlling the adjustment especially of the displacement parameters of the sample holder, the parameters of the filtering means and/or the parameters of the processing means, they have at their disposal numerous items of information linked to the acquisition of the images, the values of which can be captured and interlinked in the respective tables of the image database, making it possible to provide a relational, integrated and polyvalent image database that is capable of being interrogated in accordance with queries containing criteria corresponding at least to the conditions of acquisition of the images and/or to the identification of the sample. The result is that the user of such an imaging apparatus according to the invention has at his disposal an image database with multiple tables capable of being interrogated in accordance with rich, sophisticated and dynamic queries linked directly at least to the conditions of acquisition of the images and/or to the identification of the sample, something that prior-art databases do not provide.

According to another significant characteristic of the invention, the look-up unit furthermore comprises means of processing and/or analysis capable of processing and/or analysing the images thus acquired as well as the data linked to and/or extracted from and/or derived from the processing and/or analysis of these images.

Finally, the database is polyvalent since it is capable of being used for any imaging application (fluorescence, transmission microscopy, bright field etc.), which is not the case with prior-art databases, which are generally dedicated to a single application.

In practice, the fields of the multiple tables belong to the group formed by the X, Y and/or Z coordinates of the sample holder; the conditions of operation of the light source; the wavelength, bandwidth, attenuation factor, and/or position of the filtering means; the time conditions of image acquisition; the nature and operating parameters of the elements of the first and second transfer means; the operating parameters of the detection means; and the operating parameters of the processing means.

The look-up unit preferably comprises image-processing means of the type comprising contrast, linear filtering, operations of mathematical morphology and segmentation, as well as means of calculation of the type comprising characterisation of shape, density, texture, topology and spatial organisation and means of presenting results tables of the type comprising spreadsheets or tools for statistical analysis and interpretation.

Other characteristics and advantages of the invention will become apparent in light of the detailed description below and of the drawings, in which.

Figure 1:
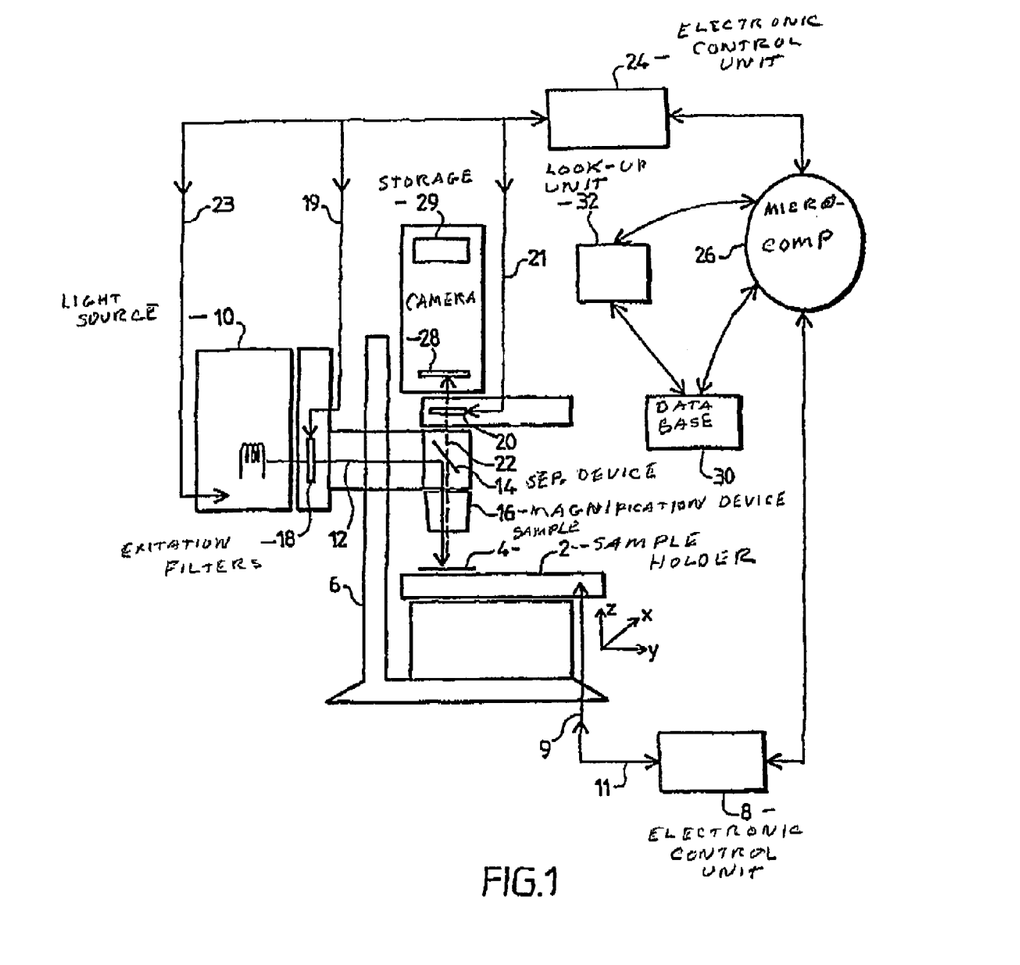
FIG. 1 shows schematically an imaging apparatus according to the invention.

Referring to FIG. 1, this shows an apparatus for imaging by fluorescence, which is associated with an image database according to the invention. It is obvious that the image database according to the invention can be associated with any other type of imaging apparatus, e.g. an optical microscope (transmission, bright field), but also a scanning electron microscope, confocal microscope etc.

The imaging apparatus in FIG. 1 comprises a sample holder 2 designed to support a sample 4. The sample holder 2 can be moved in at least two directions perpendicular to the plane of the sample (X and Y directions). The sample holder 2 is supported by a stand 6. The sample holder 2 is likewise adjustable in height (direction Z or of focus). The sample holder is, for example, a table driven by two motors, one along the X axis and the other along the Y axis. A control unit 8 controls the displacement of the motor-driven table 2 by sending selected commands 9 and by receiving responses 11 to the said commands 9.

A light source 10 is capable of generating an excitation beam 12 (for fluorescence) or an illumination beam (for observation by transmission). The excitation beam 12 is directed onto the sample 4 via transfer means that can include a specific optical separation device 14 (dichroic mirror) and an optical magnification device 16 (objective). The dichroic mirror 14 makes it possible to send the excitation radiation 12 towards the sample 4 and to allow the fluorescence emission 22 to pass towards the eye of the observer.

As a general rule, the fluorescence objective 16 magnifies by 10 to 100 times.

The light source 10 is, for example, a mercury vapour arc lamp, a xenon arc lamp or a halogen lamp (for transmission microscopy).

Excitation filters 18 arranged downstream of the source of radiation 10 make it possible to select the radiation that is useful for producing fluorescence.

Stop filters 20 arranged between the sample 4 and the eye eliminate the radiation that is re-emitted by the sample 4 and is of no significance to the phenomenon of fluorescence.

Owing to the fact that the maxima of the wavelengths of the excitation radiation and of the emission of fluorescence are close to each other (of the order of around ten nanometres), the choice of excitation filters and stop filters is an extremely delicate matter in practice. The optical means of observation are generally formed by a microscope specially adapted to the technique of observation by means of fluorescence.

The sample holder 2 is capable of carrying a plurality of samples. The electronic control unit 8 is capable of displacing the said sample holder under one or more magnifying objectives 16 of various kinds and an eyepiece. The objective or objectives 16 provides or provide an actual image of the object observed, while the eyepiece provides the eye with an enlarged virtual image.

In practice, the excitation filters 18 and stop filters 20 are carried by rotatable wheels. An electronic control unit 24 sends commands 19 and 21 towards the excitation filters 18 and the stop filters 20 in order to select the corresponding filter at the discretion of the user.

The electronic control unit 24 likewise sends commands 23 to the light source according to selected parameters, in particular concerning the intensity of the lamp and the adjustment of the diaphragm (where required).

The electronic control units 8 and 24 are driven according to programs contained in a microcomputer 26, the operating system of which is, for example, WINDOWS NT (registered trademark).

The fluorescent emission radiation 22 is detected by a camera 28 with a network of CCD-type semiconductor detectors. The signals detected by the camera 28 are recorded in digital memories 29 for the purpose of processing by image-processing programs and are stored in magnetic memories (not shown) in the microcomputer 26. The digital memories can be arranged on dedicated cards or in the microcomputer. The images are stored in the TIFF format (Tagged image file format), for example.

The camera 28 is preferably a high-resolution camera, 1280×1024 pixels for example, with a depth of measurement of the signal of at least 10 bits (1024 levels) per pixel, and with cooling by the Peltier effect. The sensor is of the ⅔" interline type. The rate of acquisition is 7 images per second at high resolution, for example. The camera 28 has an interface card of the PCI bus type linked to the microcomputer 26.

The parameters of the camera, in particular gain, offset and time of exposure can be adjusted electronically. The camera is capable of taking a single image or a series of images. After acquisition, the images are automatically placed in the "image" table of the database, which will be described in greater detail below.

According to the invention, the microcomputer 26 is capable of managing an image database 30 that not only stores the images acquired in this way but also, above all, all the parameters relating to the conditions in which these images were acquired and subsequently all the values of the parameters and information obtained from the processing and analysis of these images. The microcomputer 26 includes a look-up unit 32 which makes it possible to interrogate the database 30.

Figure 2:
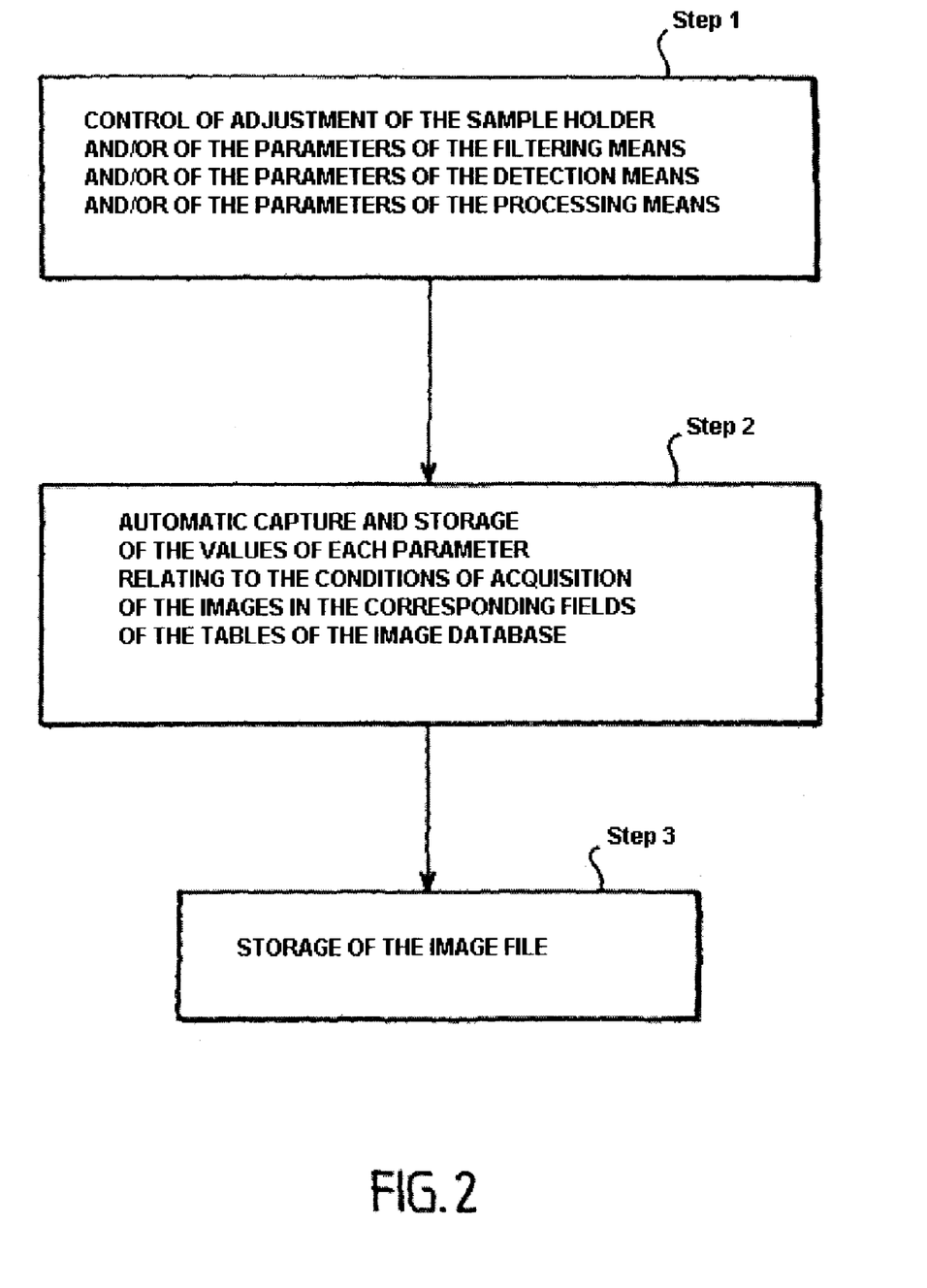
FIG. 2 is an organigram illustrating the acquisition of the images and the capture of the acquisition values in the image database according to the invention.

Referring to FIG. 2, an organigram illustrating in a general manner the acquisition of an image with the imaging apparatus according to the invention has been shown.

As described above, acquisition of an image is preceded by the control (step 1) of the elements participating in the acquisition of the image. Control is concerned particularly with the adjustment of the sample holder, the filtering means, the camera, the processing means and/or the quantitative analysis means.

After acquisition of the image, provision is made to capture the values of the parameters linked to the acquisition in the tables of the database which will be described in greater detail below (step 2). The word "capture" is here intended to mean the automatic operation of recording the values of the parameters or manual capture of these values by an operator.

The image file containing the image thus acquired is likewise stored (step 3).

In practice, the displacement of the sample holder in the X and Y directions in certain applications, such as that referred to as "capture by 2-D scanning", allows the successive examination of a plurality of cells containing a preparation to be observed or the whole of a particular structure constituting the sample.

In other applications, particularly those involving fluorescence, it is necessary to perform multispectral capture. In this case, the camera examines the sample successively through the optical observation means and through at least two different coloured or selective filters chosen as a function of the wavelength of the light radiation that they allow to pass, either for transmission through the sample or for the radiation due to fluorescence.

The storage means 29 record the electrical signals corresponding to the individual coloured images viewed and recorded digitally by the camera. Means simultaneously feed back the electrical signals to the output of the said memories, and means vary the gain and exposure time of the camera 28 in such a way that the amplitude of the output signals of the latter is always greater than a predetermined threshold and takes account of nonrepresentative signals (noise), while at the same time correcting them.

In the case of immunofluorescence, it is generally sufficient to use only two different coloured images, namely a red image and a green image. In certain cases, however, it may be advantageous to use a third image, a blue image for example.

It should be pointed out that the filter-holder wheels each comprise a disc provided with 8 coloured filters set in rotation in such a way as to move the filters successively into a position perpendicular to the light beam. A disc of this kind is driven by a motor, of the stepping type for example, the operation of which is, of course, synchronised with the rest of the apparatus according to the invention and, in particular, the storage of the signals corresponding to the individual coloured images. To ensure such synchronisation at least in part, it is advantageous to provide fixed sensors, optoelectronic and/or magnetic sensors, for example, co-operating with markers on the said disc.

The imaging apparatus according to the invention is capable of automatically acquiring images according to several modes of acquisition or acquisition protocols.

One of the protocols consists in automatically acquiring a series of images of the same sample. The sample holder is displaced according to selected movements in the X and Y directions. This protocol is referred to as "capture by 2-D scanning". More precisely, it is possible with this protocol to scan the whole of a sample systematically at a high magnification (e.g. ×40 or ×1000) along the X and Y axes. Observation can also be performed within a region of a sample, the position and surface area of which are defined graphically by the user as the result of a dialogue with the processing means, or are pre-programmed with the aid of an algorithm that makes use of a priori knowledge of the spatial structure of the sample.

Another protocol can include monitoring of the displacements along the Z axis. This protocol thus consists in acquiring several planes or sections of the same sample (batch on the Z axis). This protocol is referred to as "multi-layer 3-D capture". More precisely, it is possible with this protocol to acquire a batch of several sections of a biological sample of a certain thickness, the same area or part of a sample being observed and captured in the different planes or different positions of the sample carrier in the Z direction (expressed to a precision of a hundredth of a micron), corresponding to positioning at the focal point, this being performed by software. This function is of particular significance for the identification and measurement of objects (DNA probe) of very small size situated at different levels within the thickness of a sample in different conditions of light for observation.

Yet another protocol consists in acquiring a set of images of the same area or part of the sample using different excitation lights or fluorescent lights or different visualisation colours (red, green, blue) corresponding to the different excitation and stop filters. This protocol is referred to as "multispectral capture".

Yet another protocol consists in acquiring images according to different acquisition configurations or modalities, e.g. fluorescence, bright field, transmission). This mode is referred to as multimodal. At the end of this mode, the user can merge the resulting images for processing and subsequent interpretation.

It is also possible to monitor the time over which the images are taken and the adjustments of the capture electronics. For example, a time sequence of images, that is to say images acquired over a specified total time, is acquired at a parameterisable interval.

Moreover, the user can combine several protocols depending on the application envisaged. These acquisition protocols can furthermore be supplemented by the automatic adjustment, in transmission and/or fluorescent mode, of the positioning of a shutter to protect the sample, and by the processing of images online (during capture).

All the images thus acquired can be stored in the image database which will be described in greater detail below. These images stored in this way are advantageously capable of being processed, reloaded and merged to form subsets of images.

It is possible, for example, to implement various functions in a completely automatic way during programmed acquisition protocols. The user can also create protocols that allow combination of the functions described above. For example, the user can select automatic modes comprising time sequences and multispectral series so as to automatically perform measurements of the variations over time of the concentrations of ions, such as calcium, hydrogen, sodium, chlorine etc. within cells, especially when they are excited by drugs or by electrical signals.

In the same way, it is possible, by selecting the modes comprising a multi-plane series on the Z axis and scanning regions on the X and Y axes, to automatically carry out imaging studies by volume (three-dimensional) at very high spatial definition. Combination of these modes with the multispectral mode makes it possible to add the spectral dimension to the series of images obtained automatically (perfecting of processes for the development of medicaments or quality control in the production of industrial biological solutions).

Figure 3:
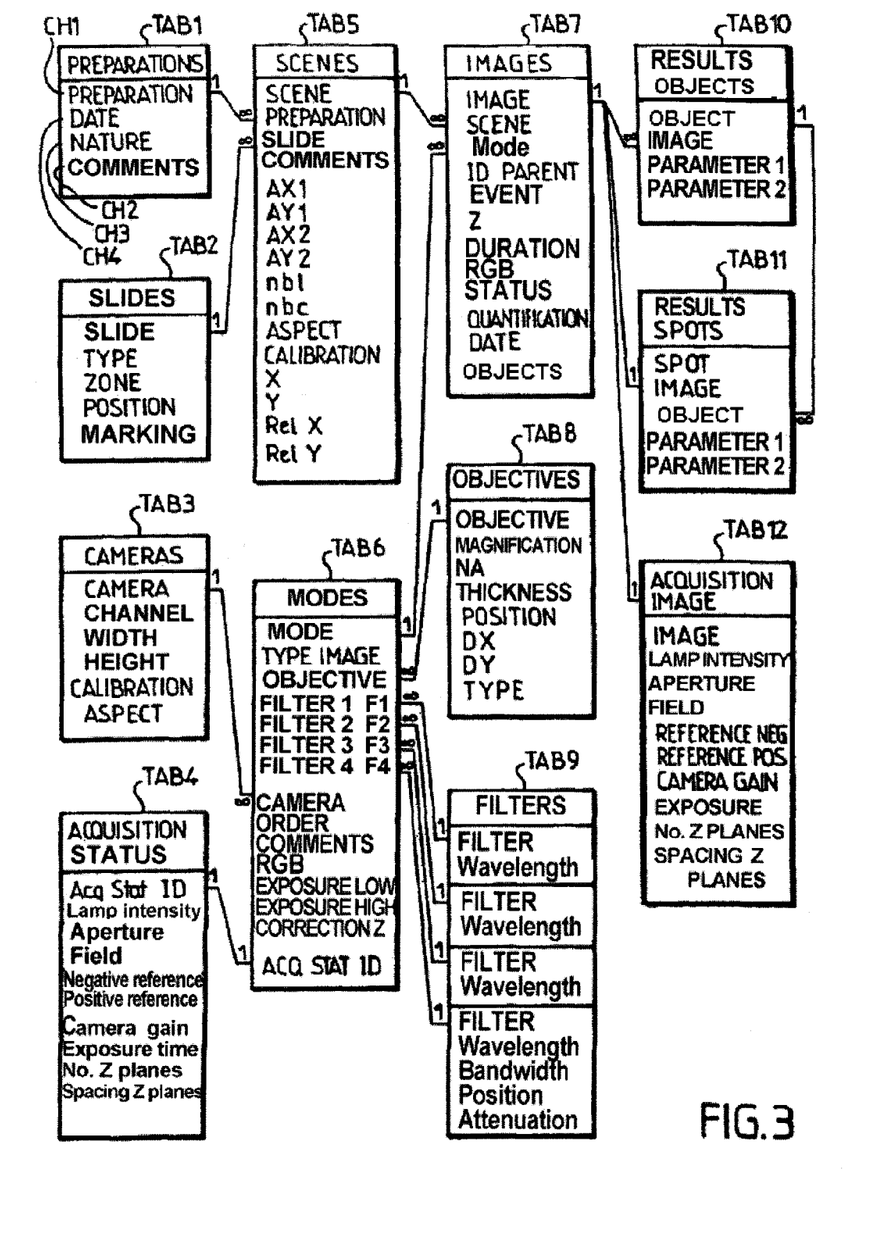
FIG. 3 shows a diagram of the image database according to the invention representing the relationships between the multiple tables.

Referring to FIG. 3, the image database according to the invention comprises a plurality of tables of parameters TAB, identified individually as TAB1 to TAB12. Each table comprises a list of parameters or fields relating at least to the displacement of the sample holder, to the filtering, excitation and stop means, to the means of processing the signals detected by the CCD camera and/or to the identification of the sample.

Table TAB1, "preparations", relates to the preparations linked to the application.

In practice, table TAB1, "preparations", comprises four fields CH, identified individually as CH1 to CH4. Field CH1 relates to the name of the preparation. Field CH2 relates to the date of preparation. Field CH3 relates to the nature of the preparation. Field CH4 is intended to receive a description of the preparation.

Table TAB2, "slides", relates to the slides.

In practice, table TAB2 comprises five fields. The first field relates to the name of the slide. The second field relates to the type of structure of the slide, e.g. a matrix of 8×3 cells. The third field relates to the region or zone of the sample to be observed. The fourth field relates to the position of the slide to be analysed in the list of X, Y and Z positions of the said slide. The fifth field relates to the focussing marks.

Table TAB3, "cameras", relates to the means of detection. This table comprises six fields. The first field relates to the name of the camera. The second field relates to the channel by which the camera is connected to the microcomputer in order to ensure capture of the images. The three [sic] to sixth fields relate to the geometry (size, number of pixels etc.) of the CCD matrix of the camera.

Table TAB4, "acquisition status", relates to the acquisition status of the images. It comprises ten fields. The first field relates to the identification of the acquisition field. The second field corresponds to the parameter relating to the intensity of the lamp. The third field corresponds to the aperture of the diaphragm of the lamp. The fourth and fifth fields relate to the negative and positive references of the channel for connecting the camera to the microcomputer. The seventh field relates to the gain of the camera. The eighth field relates to the time of exposure of the camera. The ninth field relates to the number of layers in the Z direction which are to be acquired, merged and/or processed. Finally, the tenth field relates to the distance between the different layers, the distance being expressed in micrometres.

Table TAB5, "scenes", relates to the scenes. This table comprises sixteen fields.

The first field comprises the unique identification number of the scene. The second field relates to the name of the preparation. This field is linked to the "preparation" field of table TAB1. The relationship between table TAB1 and TAB5 is of the one-to-several type, that is to say that one preparation can have several scenes. The third field relates to the name of the slide. This field is linked to the "slide" field of table TAB2. The relationship between TAB2 and TAB5 is of the one-to-several type. The fourth field is intended for comments. The fifth, sixth, seventh and eighth fields are intended for the position of the scene in the mosaic representing the scenes as a whole. If the mosaic of scenes is not referenced using the metric system, the ninth and tenth fields relate to the numbers, expressed in rows and columns, by which the scene is referenced in the mosaic. The eleventh and twelfth fields are intended for the aspect ratio and the calibration of images. This aspect ratio can correspond to the height of the pixel divided by its width. For images in the metric system, the width of the pixel is indicated in micrometres. Finally, the four last fields relate to absolute positions and relative positions on the X and Y axes.

Table TAB6, "modes", relates to the modes of acquisition. It comprises 15 fields.

The first field relates to the name of the mode of acquisition.

The second field relates to the type of imaging by which observation of the sample is carried out (fluorescence, transmission, bright field).

The third field relates to the objective. This field is linked to table TAB8, which will be described below. The relationship between TAB6 and TAB8 is of the several-to-one type.

The four [sic] to seventh fields relate to the name of the filters linked to the table relating to the filters, TAB9, which will be described in greater detail below. The filter fields are linked by several-to-one relationships.

The eighth field relates to the name of the camera. This field is linked to table TAB3 according to a relationship of the several-to-one type between TAB6 and TAB3.

The ninth field corresponds to the chronological order of acquisition (e.g. blue filter before red filter).

The tenth field is a field reserved for comments.

The coefficients which allow balancing between the colours (red, green and blue) are grouped in the eleventh field.

The exposure limits of the camera are expressed in the twelfth and thirteenth fields: low-level exposure, high-level exposure.

A correction factor on the Z axis to correct the shifts due to chromatic aberrations and focussing is provided in the fourteenth field.

Finally, a field called "acquisition" is provided. This field is linked to table TAB4 and the corresponding field by a one-to-one relationship.

Table TAB7, "images", relates to the images thus acquired according to the invention. It comprises twelve fields, for example.

The first field is the alphanumeric identification number of the image. This field corresponds to the name of the image file.

Field number two corresponds to the identification number of the scene. This field is linked to the scene field of table TAB5 according to a several-to-one relationship of TAB7 to TAB5.

Field number 3 corresponds to the name of the mode. This field is linked to the corresponding mode field of table TAB6 according to a several-to-one relationship of TAB7 to TAB6.

An identification number of the parent image is provided for the child images (field No. 4) derived from a selected processing operation on the parent image or images.

An "event" field (field No. 5) is intended to receive the information recorded during the acquisition of the images.

The Z coordinates are stored in the "Z" field (field No. 6). The duration of acquisition or relative time of image capture in seconds is to be stored in field No. 7. The colour balance coefficients (red, green and blue) are stored in field No. 8.

The state of the objects defined in the images (masks, labels) are [sic] identified in the status field (field No. 9). The quantification field is provided (field No. 10). The date of creation or acquisition of images is likewise provided (field No. 11), as is a final field (field No. 12) relating to the objects in the image (masks, labels etc.).

Table TAB8 relates to the objectives used by the imaging apparatus. It comprises eight fields. Field No. 1 corresponds to the name of the objective. Field No. 2 relates to the magnification factor. Field No. 3 relates to the numerical aperture of the objective. The depth of the focal plane is indicated in field No. 4. The position of the objective in the turret is given in field No. 5. The X and Y offset relative to the optical axis is provided in fields No. 6 and No. 7. Finally, field No. 8 relates to the type of objective (dry, oil, water).

Table TAB9 corresponds to the filter table. This table contains the name of the filter, the centre of the transmission band, the width of the transmission band in nanometres and the position of the filter on the wheel. The attenuation factor is also indicated with a factor equal to one for total transparency and a factor equal to zero for complete blocking.

Table TAB12, "image acquisition", is substantially identical to table TAB4. It furthermore comprises the "image" field (field No. 1), which is linked according to a one-to-one relationship to the "image" field of table TAB7. Table TAB12 also describes the electronic and mechanical adjustments of the various devices participating in the acquisition of the image at the moment of the said acquisition. This table is useful since it contains the main fields relating to the conditions of acquisition of the images. With the aid of this table, the user can easily select and display an image according to the criteria of acquisition.

Tables TAB10 and TAB11 relate to the results. For each image, a set of objects or zones of interest (e.g. cells, chromosomes or particles) is distinguished.

Table TAB10 is called "results-objects". It contains three fields. The first field relates to the objects in the image. The second field relates to the "image" field. This field is linked to the "image" field of table TAB7 according to a several-to-one relationship of TAB10 to TAB7. The third field and the following fields relate to the specific parameters (surface area, perimeter, intensity of fluorescence) of each object.

On each object, it is furthermore possible to observe zones of interest or spots of even smaller dimensions than the said objects. Table TAB11, which is called "results-spots", serves precisely to contain information on these zones of interest.

Table TAB11 comprises four fields. The "spot" field relates to a zone of interest on an object (e.g. silver grain in hybridisation in situ, fluorescent point). The "image" field is linked to the "image" field of table TAB7 according to a one-to-one relationship. The third field relates to the objects. This field is linked is linked [sic] to the "objects" field of table TAB10 according to a one-to-several relationship of TAB10 to TAB11. Finally, the final fields relate to the specific parameters of the spot.

Here, the innovation consists, in particular, in the fact of having several tables, each containing fields relating to the acquisition of the images, the identification of the sample and the processing and analysis of the data linked to and/or derived from and/or extracted from these images.

Figure 4:
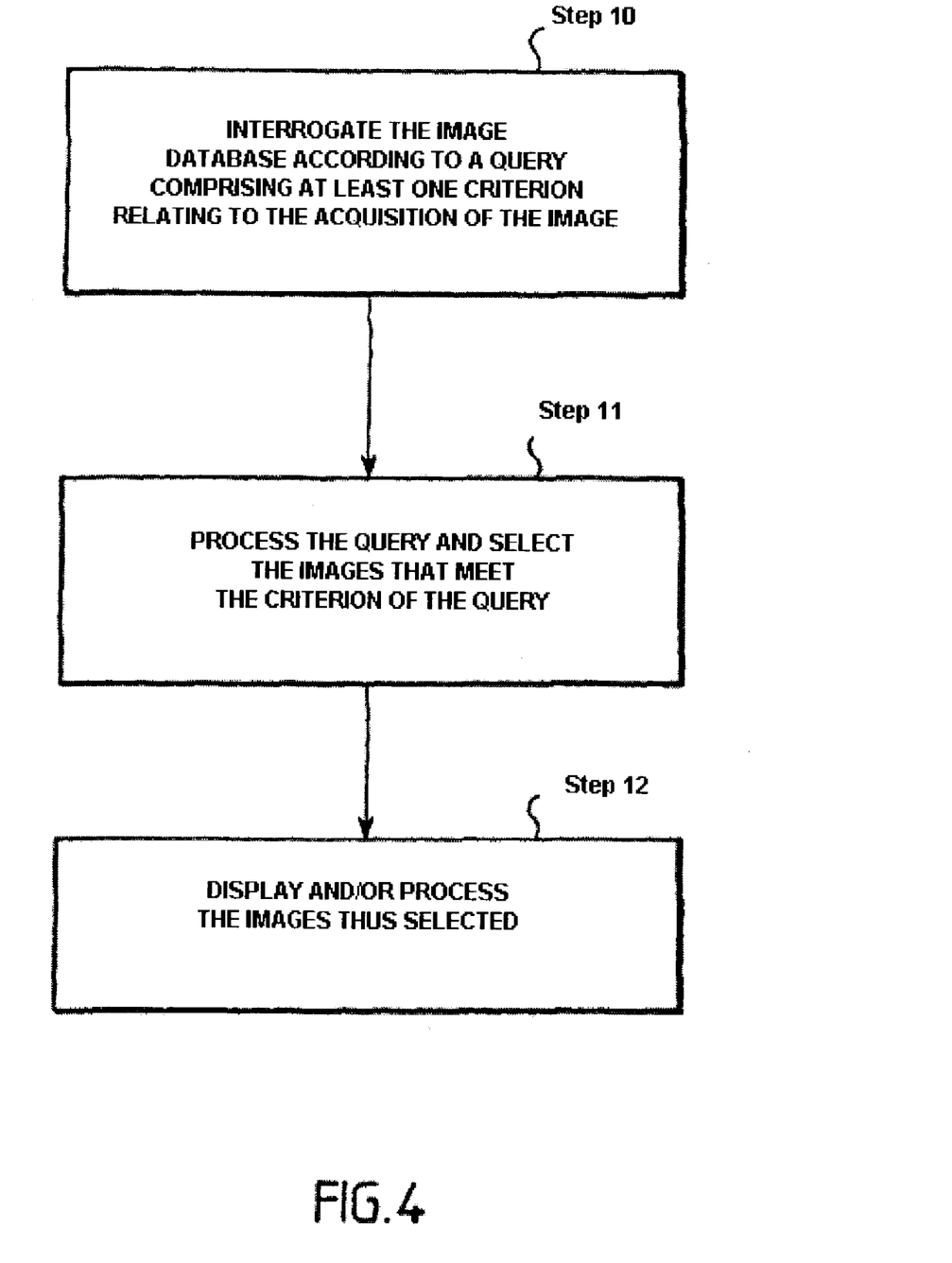
FIG. 4 shows an organigram illustrating the selection of an image stored in the image database according to the invention.

Referring to FIG. 4, it is possible to interrogate the database 30 with queries containing criteria corresponding to at least one acquisition parameter (step 10), to select the images that meet the said criteria (step 11) and display and/or process the said images thus selected (step 12).

In general terms, a query allows specific data to be sought, sorted and retrieved. The query selects a set of recordings that meet the criteria defined by the user. The result of the query forms a dynamic answer sheet.

For example, the query can comprise criteria relating to the identification of the sample (in this case with the fields of the tables entitled "preparations", "slides" and "scenes"), and to the conditions of acquisition of the images (in this case with the fields of the tables entitled "acquisition status", "modes", "objectives", "filters" and "image acquisition". Selection can also be performed with the aid of the "images" table.

Of course, the database 30 can be updated with the aid of forms. These forms also enable the data in the multiple tables to be consulted and supplemented with formatting that can be personalised.

Output states allow the information to be presented in written form or as a display on the access terminal.

The query may also require special processing of the raw images thus acquired. For example, the query may consist in measuring and displaying the level of intensity of green fluorescence within objects as identified in an image obtained with a blue filter, for example. In response to this query, the look-up unit interrogates the database, which then finds the corresponding green image thanks to the image acquisition parameters (image, scene, X and Y positions, filter, camera, exposure time etc.).

The appropriate image processing (in this case calculation of the level of intensity) is applied to the objects in the green image thus selected. The result of the calculation is output to the look-up unit.

The results table can also be interactive. Thus, it is possible, with a click of a computer mouse on a chosen value in a field of the table, for the user to highlight a chosen region of the image and clicking on an event in the image allows the user to highlight the corresponding entry (or field) in the table.

Conversely, the parameters (or fields) of tables TAB10, TAB11 and TAB12 as well as those of the "images" table, TAB7, (especially the fields "X", "Y", "Z", "mode of acquisition", "time of acquisition" etc.) make it possible to find the image or images corresponding to these parameters in the database and to display them.

It should be mentioned that the structure of the database according to the invention makes it possible to improve the analysis of the images in terms of flexibility of use and richness of processing functions.

The database according to the invention can be used, for example, in an imaging procedure intended to detect and measure the amplifications (number of copies) and deletions (suppressions) of DNA sequences in chromosomes of tumour (cancerous) cells in comparison with the same chromosomes of normal cells. This procedure, referred to as "CGH" for "Genome Comparison after Hybridisation", is a test that provides unique information as an aid to interpreting and diagnosing cancerous tumours.

The display of the profiles (level of intensity of fluorescence) can also be interactive. Thus a user can highlight selected pixels in an image. It is likewise possible for images derived from a particular processing operation (e.g. normalisation) also to be added to the database. These images can advantageously be displayed using an appropriate range of colours to make them easier to interpret. Calculations or thresholding can likewise be performed on the images with the aid of a spreadsheet or some other tool for statistical analysis and interpretation.

One specific application for the automatic procedure of analysing the data and the use of the database according to the invention is in high-magnification fluorescence microscopy. In this application, the acquisition protocol entails scanning systematically along the X and Y axes, autofocussing for each sample region observed and automatic multicolour operation, in the present case of three selective filters for excitation light and blue, red and green emission.

For example (FIG. 5), the images obtained in blue mode (step 20) contain information or represent the chromosomes present in each of the cells observed. A first, analysis algorithm, capable of combining the shape of the objects and the density of their blue colouration, makes it possible to detect the contours of these objects. At the output of this contour detection step, a binary image (containing zeros or ones at each point) is generated, this being referred to as an object mask (the objects being chromosomes in this case).

Figure 5:
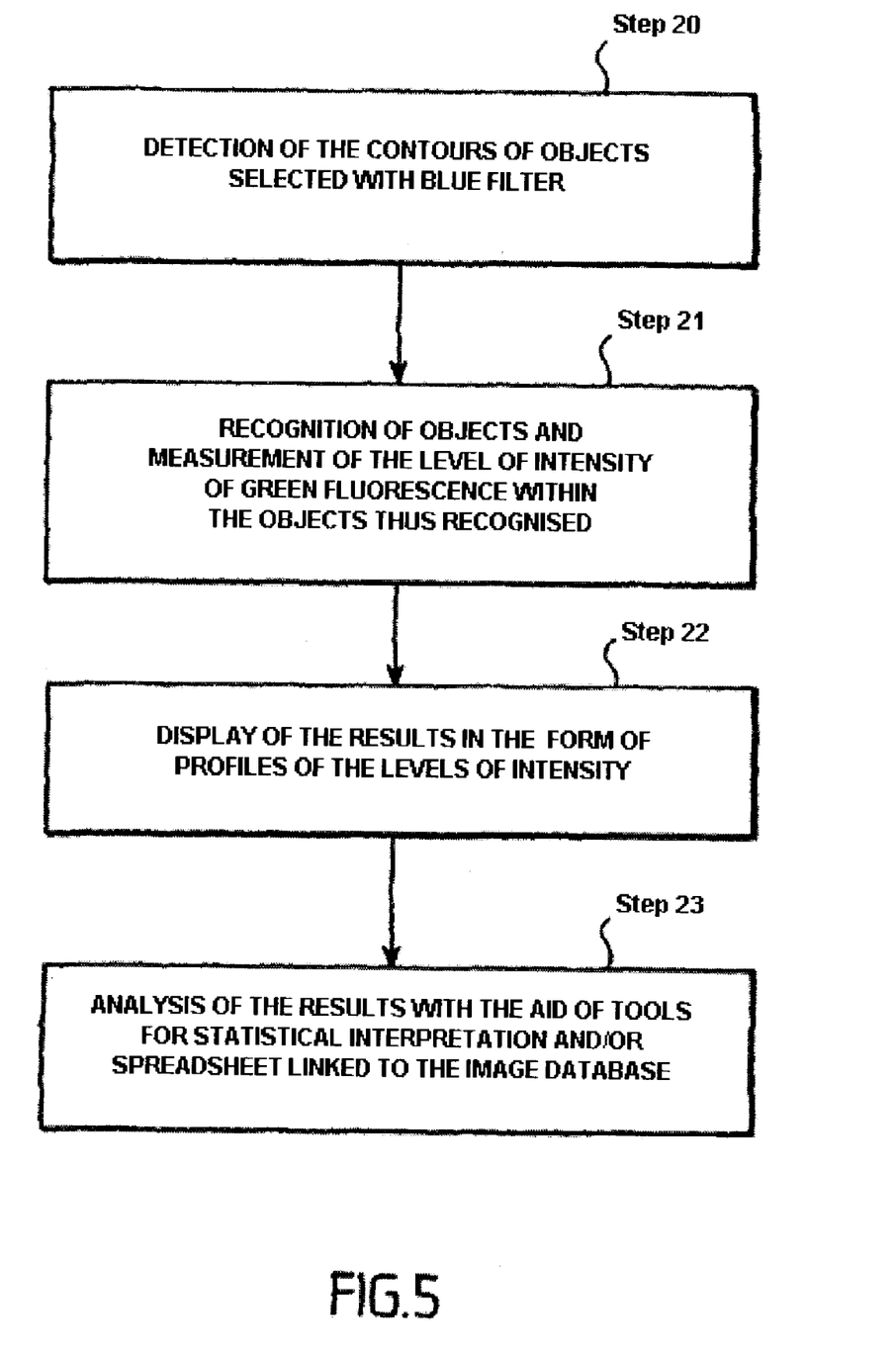
FIG. 5 shows an organigram illustrating an example of processing and analysis of images stored in the image database according to the invention.

A second, recognition algorithm (or shape characterisation algorithm) makes it possible (step 21), for example, to locate precisely the "centromeres" of each chromosome detected and to classify them by comparison with a reference database leading to the generation of an image of a particular type referred to as a karyotype, in which all the chromosomes of the cell observed are shown according to their pairing and their membership of a conventionally defined class in the reference database.

In practice, the green and red images obtained for each of the cells observed are automatically normalised by a method which itself makes use of the integrated structure of the database. The background level is evaluated by two alternative techniques, either as the value of the mode of the histogram for the distribution of intensity in the image on the outside of the contours of the chromosomes as detected by the first analysis algorithm, or as the value calculated in the immediate proximity (vicinity) downstream of a digital filter of the "top hat" type. These two values for the green background and the red background are subtracted from the green and the red image respectively. Finally, the value of the normalised ratio of the intensities measured is calculated point by point for each cell observed and on the inside of the contour of each chromosome.

During these steps 20 and 21, numerous queries are input into the image database according to the invention. These queries are formulated using the fields of the tables TAB described with reference to FIG. 3.

For example, selection by means of the "image", "scene" and "mode" fields of table TAB7 and of the "filter 1" field of table TAB6 makes it possible to identify, select and display an image of a zone of a sample obtained in blue mode. Selection of the "filter 2" field of table TAB6 makes it possible to identify, select and display the image of the same scene obtained in red mode. Likewise, selection of the "filter 3" field of table TAB6 makes it possible to identify, select and display the image of the same scene obtained in green mode.

The structure of the database furthermore enables the whole of the automatic procedure not only to be made possible but also to be made particularly efficient. In particular, the fact of rapidly finding the blue-coloured image for each cell observed with the mask (binary image) of certain objects of interest (chromosomes) and all the images associated with this cell (or more generally scenes or parts of a sample) that has been observed, in this case the green and red images, representative respectively of the marking of normal and tumorous DNA. The image of the relationship between the preceding images is itself likewise integrated into the database of this specific study. This image of the relationship between the preceding images can be analysed easily, is capable of being archived, referenced and transmitted etc. with the aid of the tools for managing this image database.

For example, the axes of the chromosomes can be calculated automatically and used in a function for generating and representing profiles of the intensity of fluorescence for each chromosome observed in green and red light. The structure of these objects in the database allows a unique function for representing visual links on the same work screen between the position and the value on a chromosome profile and the position on the image of the chromosome itself.

After their normalisation and representation according to a colour code adapted to interpretation of the values of the relationships, the images obtained for each cell or part of a sample observed can furthermore be subjected to algorithms for detecting a region of localisation of the amplifications and deletions.

At the end of this automatic detection, a result table is created, integrated with the database and displayed (step 22). For each of the regions, this table contains the class of the chromosome on which it is situated, its precise position defined with respect to the centromere and to the length of the chromosome, its surface area, the statistically significant values for the intensity of the green and red colour and for the ratio of these values, for example.

The results table (step 23) is itself represented on the screen of the access console by graphical dialogue functions that allow interactivity (made very easy by the use of the mouse and/or of the keyboard) between the various fields of the tables of the image database (image, object detected by analysis of these images, corresponding value in rows and columns of the spreadsheet). Statistical analysis and interpretation tools enable these results tables to be analysed efficiently and interactively.

The invention claimed is:

1. Imaging apparatus comprising:
   a sample holder that can be adjusted at least in the X and Y directions;
   an illumination device comprising a light source capable of generating an illumination beam, first transfer means capable of directing the illumination beam onto a sample arranged on the sample holder;
   a receiving device comprising second transfer means capable of directing radiation emitted and/or transmitted by the sample thus illuminated to detection means mounted at an output of the receiving device, the first and/or second transfer means comprising adjustable filtering means;
   processing means for processing signals thus detected by the detection means in order to acquire a corresponding image of at least one zone of the sample;
   an electronic control unit capable of controlling at least the adjustment of the sample holder and/or parameters of the filtering means and/or parameters of the processing means according to a plurality of modes of image acquisition;
   an image database linked to the processing means and capable of containing the images thus acquired, wherein the image database comprises a plurality of tables, each comprising fields relating at least to conditions of acquisition of the images and/or to identification of the sample, the tables being linked to each other according to selected relationships;
   wherein each image acquisition comprises a command for displacement of the sample holder and/or parameters of the filtering means and/or parameters of the processing means and capture of values of acquisition parameters in corresponding fields of the tables of the database; and
   the imaging apparatus comprising a look-up unit for interrogating the image database in accordance with at least one query containing at least one criterion corresponding to at least one acquisition parameter so as to select the images that meet the criterion and display and/or process the said images thus selected.

2. Apparatus according to claim 1, wherein the look-up unit further comprises means of processing and analysis capable of processing and/or analysing the images thus acquired as well as data linked to and/or extracted and/or derived from the processing and/or analysis of these images.

3. Apparatus according to claim 2, wherein the image-processing means of the look-up unit are of the type comprising contrast, linear filtering, operations of mathematical morphology, segmentation, as well as means of calculation of the type comprising characterisation of shape, density, texture, topology and spatial organisation and means of presenting results tables of the type comprising spreadsheets or tools for statistical analysis and interpretation.

4. Apparatus according to claim 1, wherein the sample holder is adjustable in the Z direction.

5. Apparatus according to claim 1 or claim 4, wherein the parameters relating to the conditions of image acquisition belong to the group formed by the X, Y or Z coordinates of the sample holder; conditions of operation of the light source; wavelength, bandwidth, attenuation factor, position of the filtering means; time conditions of the acquisition of the images; nature and operating parameters of elements forming the first and second transfer means; operating parameters of the detection means and operating parameters of the processing means.

6. Apparatus according to claim 1, wherein at least certain tables are interlinked according to relationships of the one-to-several, one-to-one and/or several-to-one type.

7. Apparatus according to claim 1, wherein the database is of the relational, integrated and polyvalent type.

* * * * *